(12) United States Patent
Doyle et al.

(10) Patent No.: US 9,845,875 B2
(45) Date of Patent: Dec. 19, 2017

(54) RING SEAL WITH SEALING SURFACE EXTENSION

(71) Applicant: Microflex Technologies LLC, Anaheim, CA (US)

(72) Inventors: Michael Doyle, Villa Park, CA (US); Gregory M. Doyle, Orange, CA (US); James Martin, El Segundo, CA (US); Roger Piper, Murrieta, CA (US)

(73) Assignee: Microflex Technologies LLC, Anaheim, CA (US)

( * ) Notice: Subject to any disclaimer, the term of this patent is extended or adjusted under 35 U.S.C. 154(b) by 0 days.

(21) Appl. No.: 14/712,969

(22) Filed: May 15, 2015

(65) Prior Publication Data
US 2015/0330510 A1    Nov. 19, 2015

Related U.S. Application Data

(60) Provisional application No. 62/000,072, filed on May 19, 2014.

(51) Int. Cl.
*F16J 15/08*    (2006.01)
(52) U.S. Cl.
CPC ....... *F16J 15/0887* (2013.01); *F16J 15/0893* (2013.01)
(58) Field of Classification Search
CPC ....... F16L 17/035; F16L 17/025; F16L 23/18; F16J 15/0887; F16J 15/025; F16J 15/0893; F16J 15/104; H02G 15/013
See application file for complete search history.

(56) References Cited

U.S. PATENT DOCUMENTS

| 3,137,509 A | * | 6/1964 | Kazienko | F16L 17/035 277/609 |
| 4,477,087 A | * | 10/1984 | Sutter, Jr. | F16J 15/0887 277/644 |

(Continued)

FOREIGN PATENT DOCUMENTS

| JP | 2004176835 A | 6/2004 |
| JP | 2013221525 A | 10/2013 |
| WO | 2011024889 A1 | 3/2011 |

OTHER PUBLICATIONS

International Search Report for PCT/US2015/030089 mailed Aug. 10, 2015; 6 pages.

(Continued)

*Primary Examiner* — Eugene G Byrd
(74) *Attorney, Agent, or Firm* — Fitch, Evan, Tabin & Flannery LLP (57) ABSTRACT

A ring seal for sealing opposing flow component sealing surfaces defines a fluid flow path that is suitable for applications such as a semiconductor manufacturing modular gas delivery system. The ring seal includes an annular extension in the form of a modified "delta" extending from one or both sealing surfaces of the ring seal. The modified "delta" extends to an apex or point above the ring seal's sealing surface. First and second extension surfaces extend in opposite directions from the apex back toward the ring seal's sealing surface. In one aspect, the first extension surface defines a ridge where the slope of the first extension surface changes to decline faster to the ring seal's sealing surface. In another aspect, the apex is located within the annular extension closer to the axial hole than to an outer radial diameter of the annular seal body.

13 Claims, 8 Drawing Sheets

(56) References Cited

U.S. PATENT DOCUMENTS

| | | | |
|---|---|---|---|
| 6,286,839 B1* | 9/2001 | Mitsui | F16J 15/128 |
| | | | 277/603 |
| 6,357,759 B1 | 3/2002 | Azuma et al. | |
| 6,357,760 B1* | 3/2002 | Doyle | F16J 15/0881 |
| | | | 277/602 |
| 6,688,608 B2 | 2/2004 | Doyle | |
| 2002/0153669 A1* | 10/2002 | Caplain | F16J 15/0893 |
| | | | 277/606 |
| 2002/0153673 A1* | 10/2002 | Caplain | F16J 15/0893 |
| | | | 277/626 |
| 2003/0164594 A1* | 9/2003 | Whitlow | F16J 15/0887 |
| | | | 277/609 |
| 2006/0055122 A1 | 3/2006 | Itoi et al. | |
| 2008/0277879 A1* | 11/2008 | Pradelle | B29C 33/005 |
| | | | 277/316 |
| 2012/0139235 A1 | 6/2012 | Koyanagi et al. | |
| 2013/0187343 A1* | 7/2013 | Tohdoh | F16J 15/0887 |
| | | | 277/590 |
| 2015/0069721 A1 | 3/2015 | Okafuji et al. | |
| 2015/0300495 A1 | 10/2015 | Vu | |

OTHER PUBLICATIONS

Written Opinion of the International Searching Authority for PCT/US2015/030089 mailed Aug. 10, 2015; 7 pages.

* cited by examiner

RING SEAL WITH SEALING SURFACE EXTENSION

RELATED APPLICATIONS

This application claims the benefit of U.S. Provisional application No. 62/000,072, filed May 19, 2014, which is incorporated by reference in its entirety herein.

TECHNICAL FIELD

The present invention relates to seals, often referred to as gaskets, for making a fluid tight sealed joint between opposed parallel surfaces.

BACKGROUND

Ring seals are typically annularly shaped, defining an axially aligned hole for fluid (liquid or gas) passage, two axially opposed end surfaces, a radial inner surface, and a radial outer surface. A simplistic ring seal has planar end surfaces and smooth circular radial inner and outer surfaces that define the inner diameter (ID) and outer diameter (OD) of the ring seal. It is common practice in the industry, however, to utilize seals having different radial cross-sections to obtain varying sealing capabilities for different fluid flow environments.

A commonly used ring seal is circular and has a radial cross-section of a "C" shape. These "C seals" are constructed with the open side of the C construction facing the center of the ring such as is described in U.S. Pat. No. 5,354,072, ("the '072 patent") or with the open side of the C facing away from the center of two mating surfaces are brought together with the C seal in the middle, where the C seal is compressed with the open side of the C cross-section closing during compression. The ductile properties of the seal permit plastic deformation to occur without damaging the mating surfaces. To increase the elastic recovery of the seal, some C seals are provided with a circular elastic helical spring concentrically located within the center of the seal which also alters the compression resistance and elasticity properties to that desired for particular sealing assemblies. Unfortunately, it is relatively complicated to manufacture a C seal having an internal helical spring resulting in the construction of acceptable seals being typically non-repeatable.

Some C seals are provided with a circular ridge, also referred to in the art as a "delta," formed on the surfaces that come in contact with the opposed parallel surfaces that are intended to be sealed. These ridges lessen the initial contact area between the seal and the parallel opposing surfaces thereby requiring less load to plastically deform the seal, where the deformation allows the seal to accommodate and seal off minor distortions in the parallel surfaces. Unfortunately, C seals with these circular ridges often form a chamber between the circular ridge and the outer surface of the C seal as the seal is compressed. Though this seal may be leak-proof, or have a leak of a sufficiently low value as to be within tolerances, a "virtual leak" is created if there is a leak between this cylindrical chamber and the interior passage of the seal, thereby permitting gases or liquids to flow slowly there between. Though a leak-proof seal is in effect, testing of the seal may erroneously and undesirably reflect that a leak exists, and this condition is therefore referred to as a "virtual leak."

Figure 1:
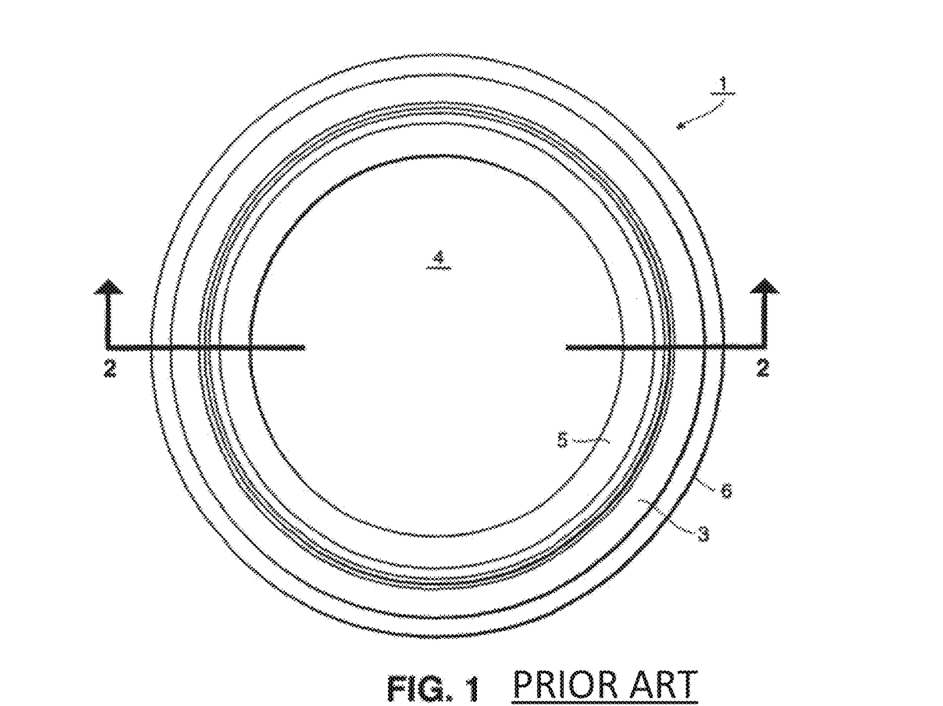
FIG. 1 is a top view of a prior art seal.
Figure 2:
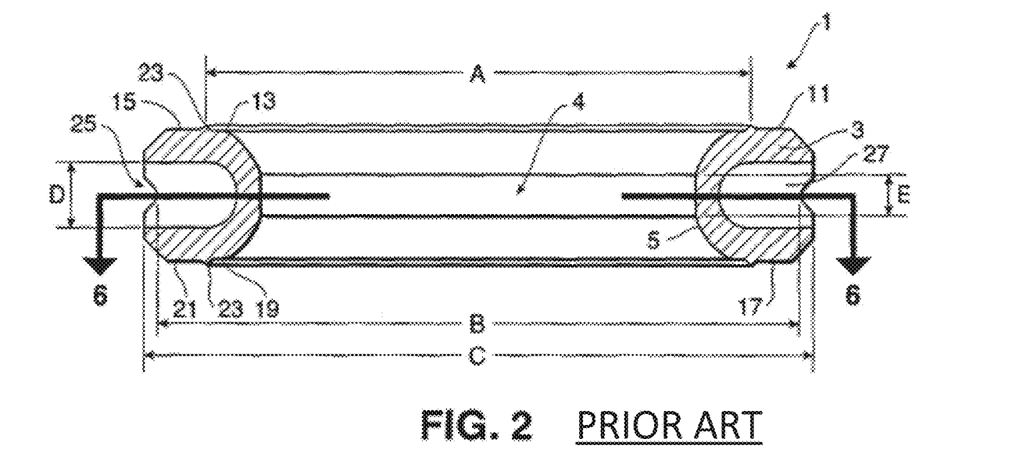
FIG. 2 is a cross-sectional view along line 2 of the prior art seal shown in FIG. 1.

Modified C seals are known that include an extension extending above the sealing surface of the seal, for example, as described in U.S. Pat. No. 6,688,608, which is incorporated by reference as though re-written herein in its entirety. Such extensions allow for a reduced load or compression force to be used to initiate plastic deformation of the seal when it is compressed between the flow path's sealing surfaces. One example of such a known seal is illustrated in FIGS. 1 and 2. As shown in the figures, the previous ring seal 1 includes an annularly shaped body element 3 having an axial aligned center hole 4 for permitting the passage of gases or fluids therethrough. Due to the annular construction of the ring seal 1, the ring seal 1 includes a radial inner surface 5, a radial outer surface 6, a first axial end surface 11, and a second axial end surface 17. Each of these surfaces may take any number of configurations. They may be substantially flat and planar, or substantially curved. For example, the radial inner surface 5 includes a flat region 7 and curved regions 9. Similarly, the outer radial surface 6 is shown to include a planar surface and an angled abutment. These surfaces may take other forms.

The known ring seal 1 further includes a plurality of bores 25 which project inwardly from the ring seal's radial outer surface 6 towards the ring seal's center hole 4. The formation of the bores 25 creates a plurality of sidewalls 27 which also extend radially from the ring seal's radial outer surface 6, and axially between the ring seal's axial end surfaces 11 and 17.

The illustrated known ring seal 1 also includes a circular ridge or extension 23, which projects axially from the axial end surfaces 11 and 17. The extension 23 divides the first axial end surface 11 into a first inner axial end surface 13 and a first outer axial end surface 15. Similarly, the extension 23 that projects from the second axial end surface 17 divides that axial end surface into a second inner axial end surface 19 and a second outer axial end surface 21. The inner axial end surfaces 13 and 19 recess inwardly with respect to the outer axial end surfaces 15 and 21 to produce an offset. The thickness of the ring seal 1 as measured at the inner axially end surfaces 13 and 19 is thinner than the thickness of the ring seal 1 as measured at the outer axial end surfaces 15 and 21. A problem with such a ring seal 1 is that the ridge or extension 23 can be damaged during handling or installation. For example, the extension may be nicked or dented. Such damage can result is an inadequate seal.

Still another type of ring seal known in the industry is the "W" seal. Such a sealing system is disclosed, for example, in U.S. Pat. No. 7,140,647 ("the '647 patent"), also herein expressly incorporated by reference, in its entirety. The "W" seal in the '647 patent uses a snap ring situated on the inside of a retaining ring, identified in the patent as a guide, to retain the W-seal in the retainer and to keep the sealing surfaces on the W-seal or gasket protected from scratches. The '647 patent retainer or guide also has a snap ring situated on its outside diameter to keep the retainer engaged in the counterbore, which defines the opposing parallel surfaces to be sealed.

An additional known seal is a "V seal," which is also circular but instead of having a "C" cross-section, the V seal has a "V" cross-section with the low point of the V constructed to point either inwardly or outwardly towards the center of the seal. Though this construction typically provides for sufficient deformation, the V seal does not typically provide particularly good elastic recovery or repeatability because the point of the V seal forms a stress raiser that concentrates the compression loads and makes the seal prone to failure upon repeated compressions and decompressions of the seal.

Additional seals in the art include "Z seals" and simple "O rings." Each of these seals also suffer various disadvantages.

SUMMARY

Pursuant to these various approaches, an example ring seal for sealing opposing flow component sealing surfaces defining a fluid flow path and suitable for applications such as a semiconductor manufacturing modular gas delivery system is described. The example ring seal includes an annular extension in the form of a modified "delta" extending from one or both sealing surfaces of the ring seal. The modified "delta" extends to an apex or point above the ring seal's sealing surface from which the modified "delta" extends. First and second extension surfaces extend in opposite directions from the apex back toward the ring seal's sealing surface. In one aspect, the first extension surface defines a ridge where the slope of the first extension surface changes to decline faster to the ring seal's sealing surface.

So configured, during compression of the ring seal between the flow component sealing surfaces, a first load or compression force plastically deforms the annular extension or modified "delta" at the apex and continuing down to the annular extension's ridge. This deformation work hardens the ring seal material that is thus deformed. A second load or compression force greater than the first load is needed to continue the deformation of the ring seal past the ridge. The shift in force discourages a user from over loading the ring seal, which can damage the flow component sealing surfaces.

In another aspect, the apex is located within the annular extension closer to the axial hole than to an outer radial diameter of the annular seal body defined by an outer surface radially opposite that of an inner surface that defines the axial hole. With this configuration, the deformation between the apex and the ridge provides a greater sealing area to provide a seal even where a portion of the annular extension may be damaged during handling, usually at the extension's apex.

These and other benefits may become clearer upon making a thorough review and study of the drawings and the following detailed description. In these accompanying drawings, like reference numerals designate like parts throughout the figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 3:
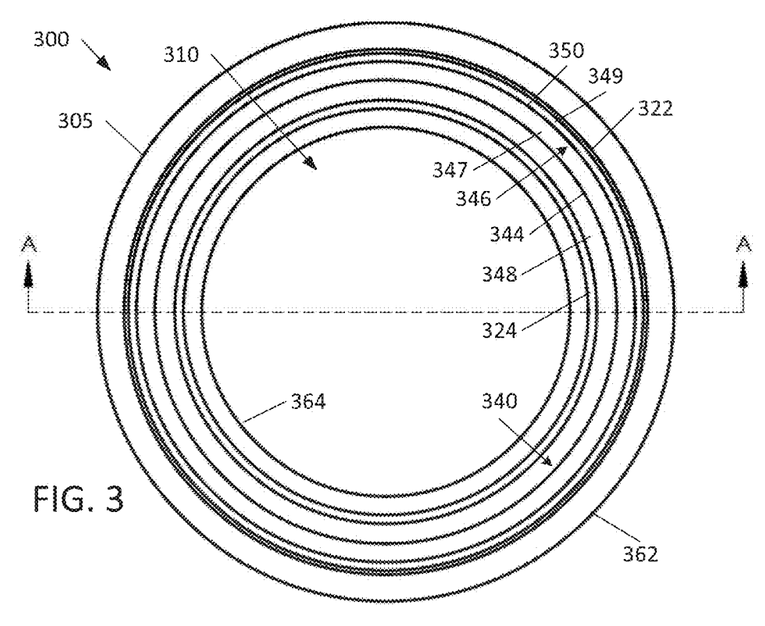
FIG. 3 is a top view of an example ring seal configured in accordance with various principles of the invention.
Figure 4:
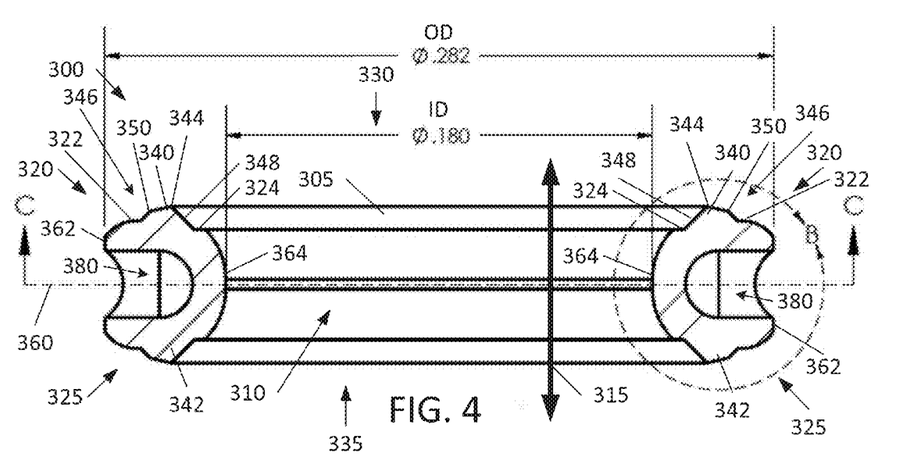
FIG. 4 is a cross-sectional view along line A-A of the ring seal shown in FIG. 3.
Figure 5:
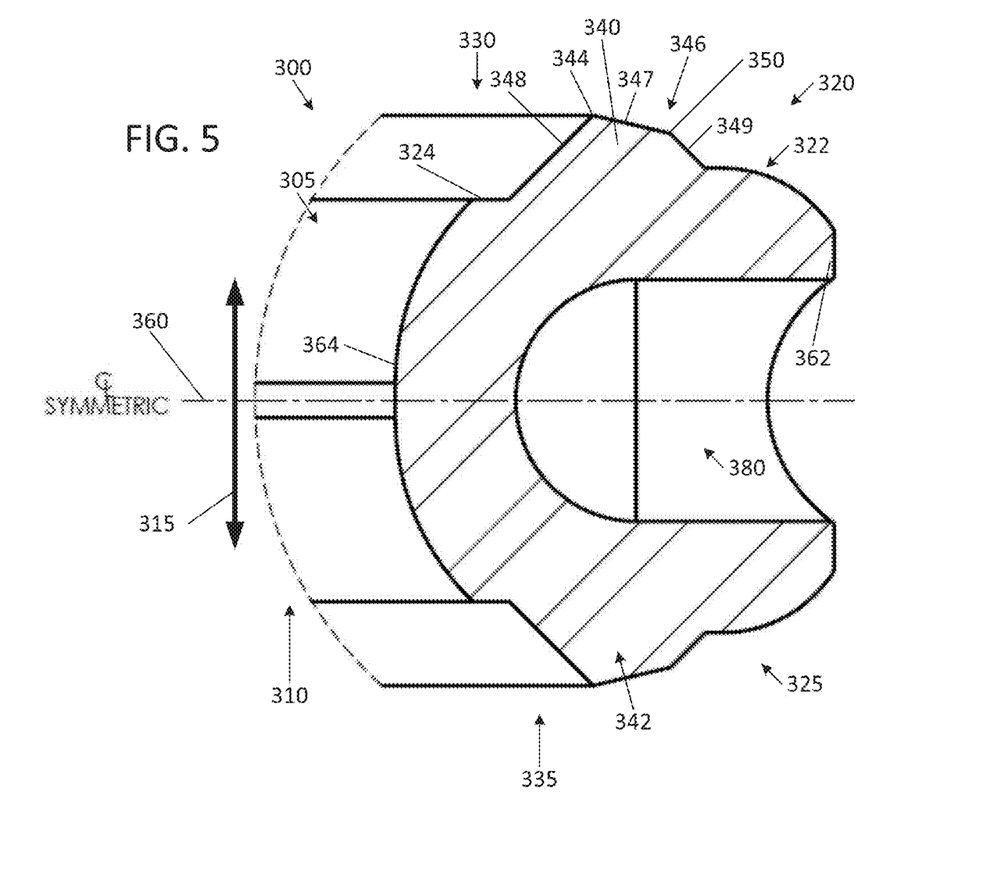
FIG. 5 is an isometric view of portion of the ring seal of FIG. 3 indicated by line B.

Referring now more particularly to FIGS. 3-5, an example ring seal 300 for sealing opposing flow component sealing surfaces defining a fluid flow path will be described. The terms "lower" and "upper" are with respect to the figures only and not necessarily with the orientation of the sealing assembly in an actual installation. The illustrated ring seal 300 includes an annular seal body 305 that defines an axial hole 310 for fluid passage in an axial direction illustrated by the arrow 315. The seal material should have an elastic property to allow compression and spring back for good sealing along the axial flow path when compressed between elements that define the flow path. In a seal used in a wafer fabrication environment where high purity of the gases passing through the flow path is required, materials such as 316 double melt stainless steel, nickel, HASTELLOY (available from Central States Industrial Equipment & Service, Inc.), and AL-6XN (available from Central States Industrial Equipment & Service, Inc.) are exemplary suitable materials.

Opposing sealing surfaces 320 and 325 are disposed on opposing axial ends 330 and 335 of the annular seal body 305. An annular extension 340 and 342 extends from at least one of the opposing sealing surfaces 320 and 325 (illustrated here as extending from both) in an axial direction. The annular extensions 340 and 342 may have different configurations or the same configuration such that the ring seal is symmetrical around a center line 360 perpendicular to the axial direction 315. For simplicity, details regarding the annular extension 340 and 342 will be described with respect to the first annular extension 340 with the understanding that the description of such aspects can apply in any combination between to the two extensions 340 and 342.

More specifically, the annular extension 340 includes an apex 344. A first extension surface 346 and a second extension surface 348 respectively extend in opposite directions from the apex 344 back toward the sealing surface 320 from which the annular extension 340 extends. The first extension surface 346 has a first general angle relative to the axial direction 315 and defines a ridge 350 by transitioning to a second general angle relative to the axial direction 315 extending back toward the sealing surface 320 at a steeper general angle, i.e., sloping toward the sealing surface 320 more than the first extension surface 346. The first general angle will typically be in the range of about 91 to about 125 degrees, and more about preferably 95 to about 110 degrees, and most preferably about 99 degrees, and the second general angle will typically be in the range of about 110 to about 175 degrees, and more preferably about 125 to about 145 degrees, and most preferably about 135 degrees. Optionally, the second extension surface 348 extends back toward the sealing surface 320 at a steeper general angle than the overall first extension surface 346, preferably between about 110 degrees and about 175 degrees, more preferably between about 125 and about 145 degrees, and most preferably about 135 degrees. In another optional aspect, the apex 344 is located closer to the axial hole 310 than an outer radial diameter ("OD") of the annular seal body 305 defined by an outer surface 362 radially opposite that of an inner surface 364 that defines the axial hole 310. Preferably, the apex is located in the inner half, and more preferably inner ⅓, of the extension's width so that the apex is located in the inner half, and more preferably the inner ⅓, of the final compressed sealing surface. With this arrangement any damage to the apex does not interfere with the majority of the sealing surface, and more preferably on the outer ⅔ of the sealing surface. In previous designs, the apex was in the center of the delta with equal sealing surface on both sides of the apex, leaving less continuous sealing surface to protect against leaks caused by damage to the apex.

Although these extension surfaces are illustrated as straight line surfaces in cross-section, these straight line surfaces could be slightly curved, in which case the above described angles would apply to an average angle for the respective surface portion relative to the axial direction. For instance, the average angle for the portion 347 of the first extension surface 346 between the apex 344 and the ridge 350 will be less steep than average angle of the potion 349 of the first extension surface 346 between the ridge 350 and the sealing surface 320 when one or both of these portions 347 and 349 are curved.

Eventually, the first extension surface 346 and a second extension surface 348 respectively transition to sealing surface portions 322 and 324, which will typically be approximately perpendicular to the axial direction 315, although these portions 322 and 324 need not be so arranged. For example, the sealing surface portion 322 to the outside edge of the ring seal 300 starts perpendicularly and then curves toward the center line 360 as the portion 322 extends away from the axial hole 310. In one aspect, the second extension surface 348 transitions to its respective sealing surface portion 324 closer to the center line 360 for the annular seal body 305 perpendicular to the axial direction 315 than the first extension surface 346 transitions to its respective sealing surface portion 322. In other words, the inner axial end surfaces as defined by the sealing surface portions 324 on either side of the ring seal 300 are recessed with respect to the outer axial end surfaces as defined by the sealing surface portions 322 on either side of the ring seal 300 such that the thickness of the ring seal 300 measured at the inner axial end surfaces is thinner than the thickness of the ring seal as measured at the outer axial end surfaces. So configured, to the extent that the ring seal 300 flexes toward its outer diameter (away from the axial hole 310), the sealing surface portion 324 is less likely to engage the flow component sealing surface because it is further away from that flow component sealing surface. Accordingly, the risk of a virtual leak caused by engagement of the sealing surface portion 324 with the flow component sealing surface is reduced.

Moreover, in the case where the apex 344 is located within the annular extension closer to the axial hole 310 than an outer radial diameter ("OD") of the annular seal body 305 defined by an outer surface 362 radially opposite that of an inner surface 364 that defines the axial hole 310, the possibility of nicks in the apex 344 causing a leak is further reduces because the nick will be located on an inner portion of the sealing surface toward the axial hole 310. This inner portion should be fully sealed because the remainder of the relatively thicker or longer first portion 347 of the first extension surface 346 will deform and engage the fluid component sealing surface thereby providing a larger sealing surface between the seal flaw at the apex and the outside of the seal.

In a further aspect, the example ring seal 300 further includes a plurality of bores 380 projecting inwardly from the ring seal's radial outer surface toward the ring seal's center. The formation of the bores creates a plurality of sidewalls extending radially the length of the bore and axially between the ring seal's axial end surfaces. The plurality of bores may take any number of configurations. For example, preferably the bores are constructed by drilling radially from the ring seal's radial outer surface toward the ring seal's center to minimize costs and reduce any difficulties in manufacturing. Bores constructed in this manner have a circular cross-section. The bores may also be substantially rectangular in configuration forming substantially planar sidewalls extending axially between the ring seal's axial end surfaces and radially between the ring seal's inner and outer radial surfaces. In another approach, these planar sidewalls are constructed at an angle with respect to the axis of the ring seal, thus forming openings on the ring seal's radial outer surface in the form of a parallelogram.

For simplicity, the bores are illustrated as having a circular cross-section though the bores may have cross-sections of other shapes without departing from the spirit or scope of the invention. The number of bores and their diameter may vary depending on the desired mechanical properties of the sealing assembly. For example, an increase in the number of bores or increase in the diameter of the bores causes a corresponding decrease in the thickness of the ring seal's internal sidewalls which will alter the mechanical characteristics of the seal, including increasing the seal's ability to deform. However, this increase in the number of bores or increase in the bores' diameter may diminish the elastic recovery (rebound) of the seal after compression and decompression. In a preferred embodiment, the bores are cylindrical and have diameters of between 25% and 75% of the thickness of the ring seal. Diameters less than 25% will significantly reduce the ring seal's ability to elastically deform. Meanwhile, increasing the diameter of the bores beyond 75% of the thickness of the ring seal will weaken the structural integrity of the seal and make the seal prone to failure during compression. In a preferred approach, the bores have a diameter of approximately 50% of the thickness of the ring seal.

A method of sealing a fluid flow path that extends between two fluid flow components 710 and 720 using a ring seal as described above will be discussed with reference to FIGS. 6-8. The annular seal body 305 is placed 610 on a flow component sealing surface 715 such that the annular seal body 305 (more specifically, the apex 340) contacts the flow component sealing surface 715 for a first fluid flow component 710 of the two fluid flow components. The two fluid flow components 710 and 720 are secured 620 to each other (typically using screws on either side of the flow path) to align the flow component sealing surfaces 715 and 725 of the two fluid flow components 710 and 720 along the fluid flow path and to compress opposing sealing surfaces 320 and 325 on opposing axial ends 330 and 335 of the annular seal body 305 with the flow component sealing surfaces 715 and 725. This compression results in deformation of the annular seal 305.

Figure 6:
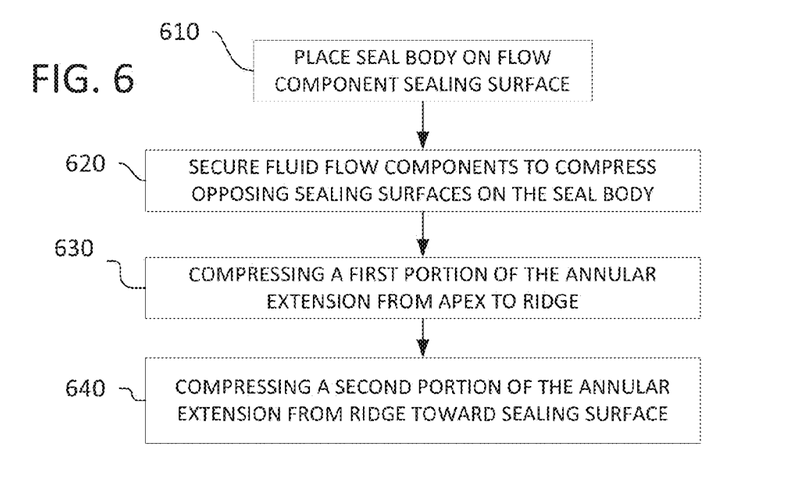
FIG. 6 is a flow diagram illustrating an example method of sealing a flow path in accordance with various principles of the invention.
Figure 7:
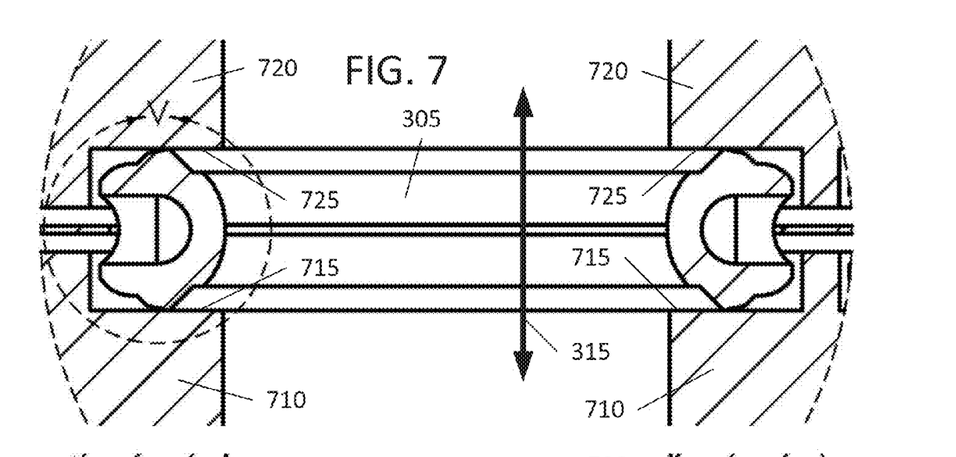
FIG. 7 is a cross-sectional view illustrating an example ring seal in accord with FIGS. 3-5 set between fluid flow components prior to compression in accordance with various principles of the invention.
Figure 8:
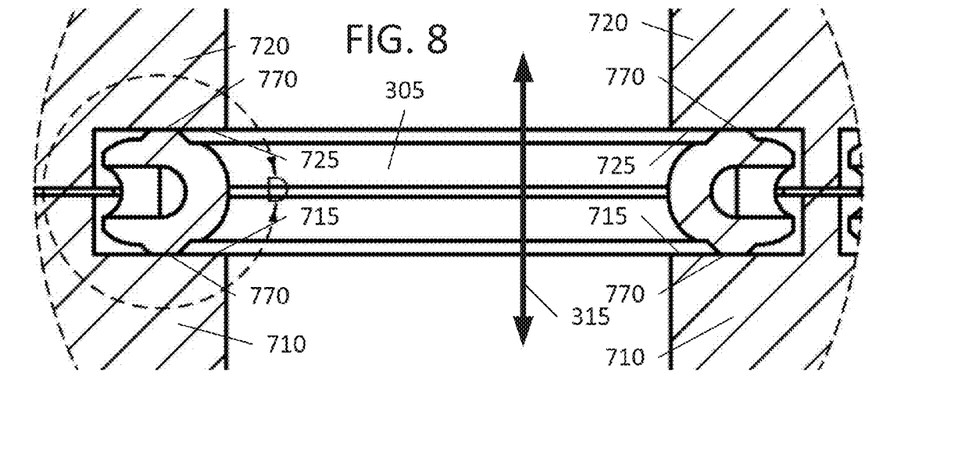
FIG. 8 is a cross-sectional view illustrating the example ring seal and fluid flow components of FIG. 7 after compression in accordance with various principles of the invention.

The compression process includes a first compression 630 of the annular extension 340 at a first compression force during compression of a first portion of the annular extension 340. The first portion of the annular extension 340 is defined by the first extension surface 347 between the apex 344 and the ridge 350 where the first extension surface 347 has a first general angle relative to the axial direction 315 and defines the ridge 350 by transitioning to a second general angle relative to the axial direction 315 that extends back toward the sealing surface 322 at a steeper general angle than the first extension surface 347. This first compression deforms the first portion of the annular extension 340 thereby creating a sealing engagement between the first portion of the annular extension 340 and the flow component sealing surface 725. A second compression 640 of the annular extension 340 occurs with a second compression force higher than the first compression force during compression of a second portion of the annular extension 340. Here, the second portion of the annular extension 340 is defined by the first extension surface portion 349 having the second general angle relative to the axial direction 315 extending back toward the sealing surface 322. At this point in the compression and deformation process, the compression process must deform the additional material of the second portion of the annular extension 340, thereby increasing the force needed to compress the seal up until the fluid flow components (outside of the portions engaging the seal) are compressed together.

FIGS. 7 and 8 illustrate the states of the annular seal body 305 and the two fluid flow components 710 and 720 along the fluid flow path before and after the compression process, respectively. When the annular seal body 305 is placed 610 on a flow component sealing surface 715, the apex of the bottom annular extension engages the sealing surface 715 as illustrated in FIG. 7. The other sealing surface 725 similarly engages the apex of the top annular extension prior to compression. When the first and second compression processes are complete as illustrated in FIG. 8, the seal is deformed in a number of ways. First, the annular extensions are deformed along the flow component sealing surfaces 715 and 725 to create a fluid-tight seal 770 at the intersection of the seal and the flow component sealing surface. The first portion of the annular extension 340 defined by the first extension surface 347 is completely deformed and subsumed by the fluid-tight seal 770 between the annular seal body and the respective flow component sealing surfaces 715 and 725, which deformation occurs during the first compression 630. A portion of the second portion of the annular extension 340 defined by the first extension surface portion 349 is deformed and subsumed by the fluid-tight seal 770, which deformation occurs during the second compression 640. When the apex 344 is located closer to the axial hole 310 than an outer radial diameter of the annular seal body 305, the apex portion of the annular extension is located near or next to a gap between the seal's sealing surface portion 324 and the respective flow component sealing surfaces 715 and 725 (preferably in the inner ⅓ of the fluid-tight seal 770) so that most of the fluid-tight seal 770 (preferably at least ⅔ of it) is disposed between the apex portion and outside gap between the seal's sealing surface portion 322 and the respective flow component sealing surfaces 715 and 725. So configured, any nicks or damage to the apex that may result in a poor seal on an inner part of the fluid-tight seal 770 is very likely fully sealed from the outside by the remainder of the fluid-tight seal 770. Other deformations of the seal beyond that of the extensions include a thickening of the inner portion of the seal as the overall height of the seal is compressed.

Figure 9:
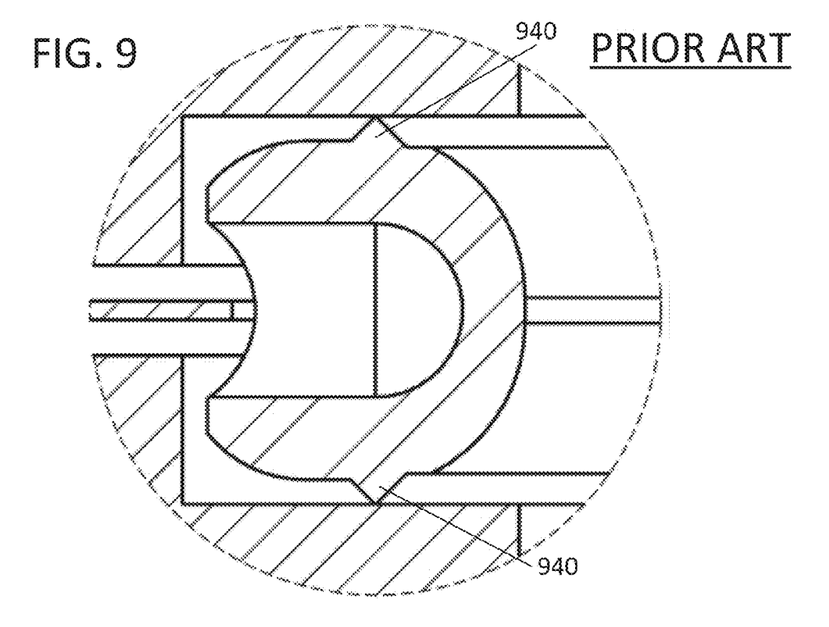
FIG. 9 is a cross-sectional view illustrating an example ring seal with a prior art standard "delta" or extension set between fluid flow components prior to compression.
Figure 10:
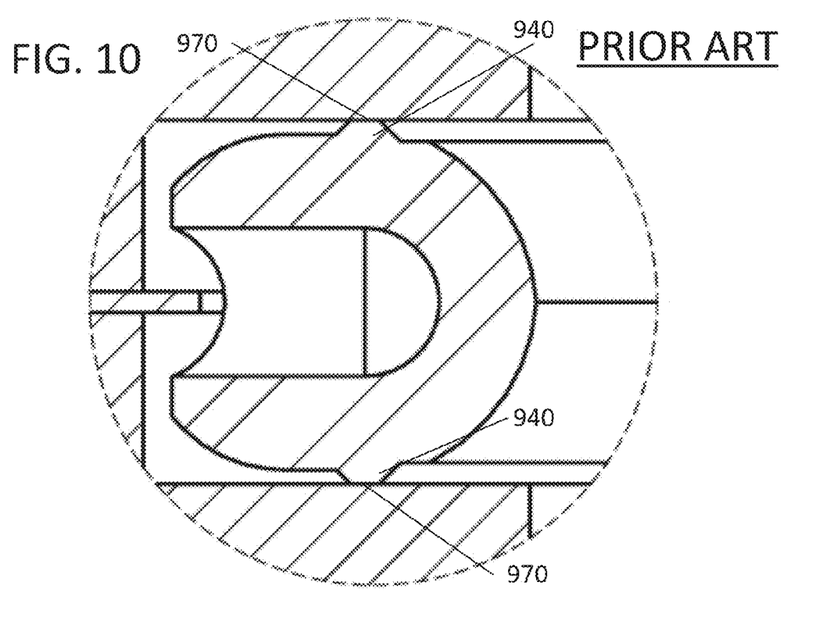
FIG. 10 is a cross-sectional view illustrating the example ring seal and fluid flow components of FIG. 9 after compression.

Certain advantages of the disclosed configuration can be understood with comparison of the above description with FIGS. 9, 10, 12, and 13, which illustrate the pre- and post-compression states of two other seal configurations. More specifically, FIGS. 9 and 10 illustrate a cross-section of a prior art seal with a standard "delta" or extension prior to and after compression, respectively. With this example, the "delta's" tip or apex is approximately in the middle of the extension such that after compression, the compressed apex is in the middle of the deformed delta. This reduces the ability of the material on either side to create a complete seal around a potential nick or dent in the "delta" or extension. Moreover, as compared to the fluid-tight seal 770 surface illustrated in FIG. 8, the fluid-seal surface 970 in the case of a standard delta has an about 2.5 times smaller cross-section meaning that this fluid-seal surface 970 provides a smaller sealing surface between the inner vacuum and outer area. This increases the chance for damage to the delta to result in a leak in the seal.

Figure 11:
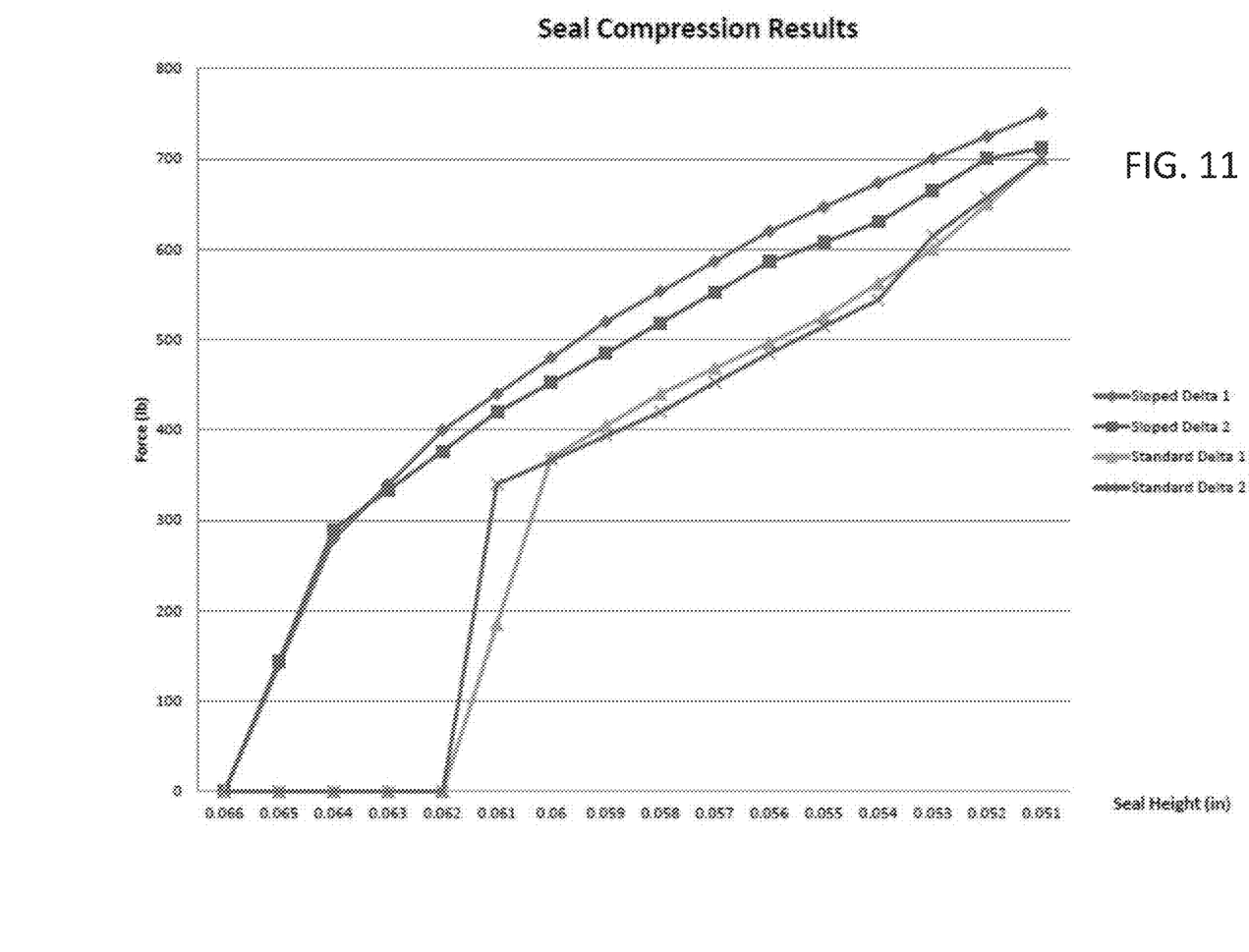
FIG. 11 is a graph illustrating actual test results of the amount of force needed to compress two seals made in accord with FIGS. 3-5 and two seals made in accord with FIG. 9.

FIG. 11 illustrates a further and unexpected result of use of a delta designed as described herein. FIG. 11 illustrates testing results of compressing a seal having the design of FIGS. 3-5 as compared to the standard "delta" of FIGS. 9 and 10. The graph shows the amount of compression of the seals in inches along the X-axis that results from application of the forces illustrated on the Y-axis. As shown in the graph, the modified or sloped "delta" of FIGS. 3-5 consistently compresses with only slightly more applied force across the entire compression range. Thus, it is surprising to be able to accomplish the two and one half larger fluid-tight sealing surface 770 of the modified delta illustrated in FIG. 8 (as compared to the fluid-tight sealing surface of the standard "delta" of FIGS. 9 and 10) with only marginally more force than the force needed to create the smaller fluid-tight sealing surface 970 of the standard "delta." Thus, a much larger sealing surface 770, which provides a higher likelihood of stopping any leaks including those caused by damage to the seal, contaminated sealing surfaces, damaged sealing surfaces, misaligned sealing surfaces, or not fully compressed seals, is provided with only slightly more applied force.

Figure 12:
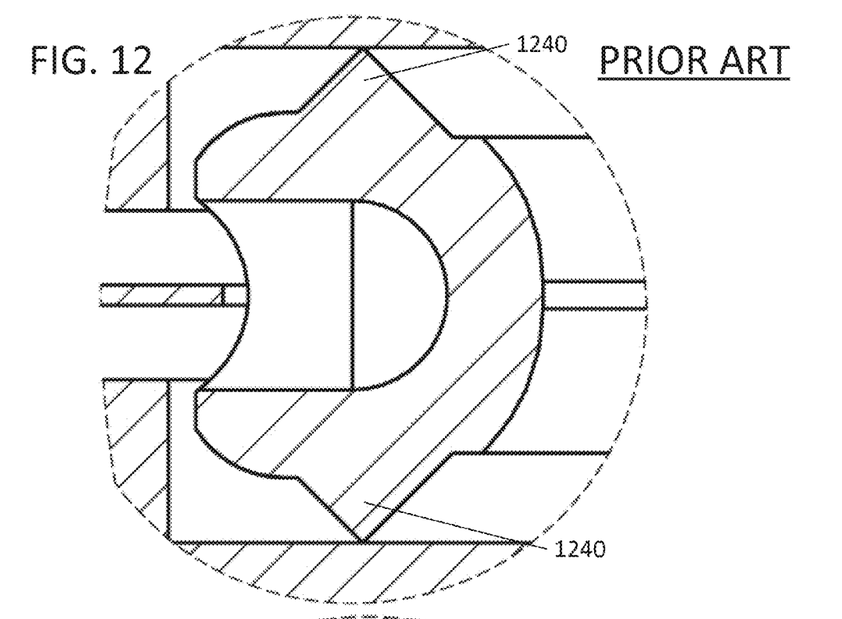
FIG. 12 is a cross-sectional view illustrating an example ring seal with a prior art large "delta" or extension set between fluid flow components prior to compression.
Figure 13:
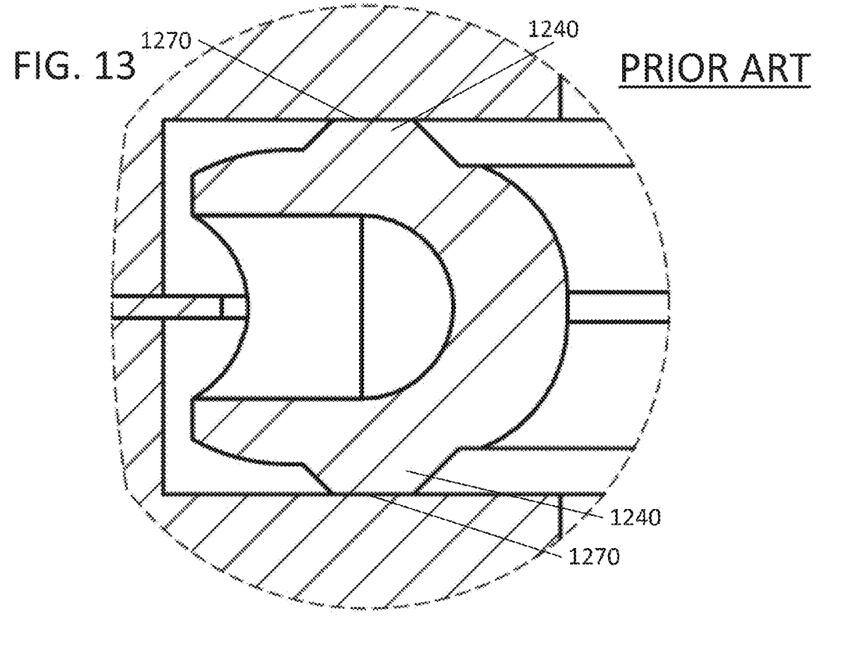
FIG. 13 is a cross-sectional view illustrating the example ring seal and fluid flow components of FIG. 12 after compression.
Figure 14:
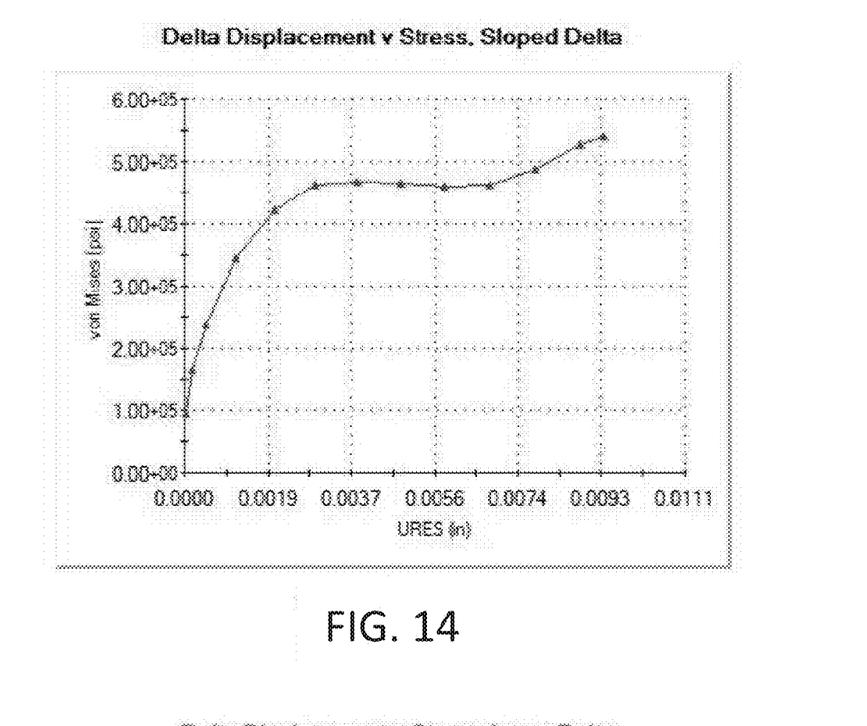
FIG. 14 is a graph illustrating modelling results of the amount of force needed to compress a seal made in accord with FIGS. 3-5.
Figure 15:
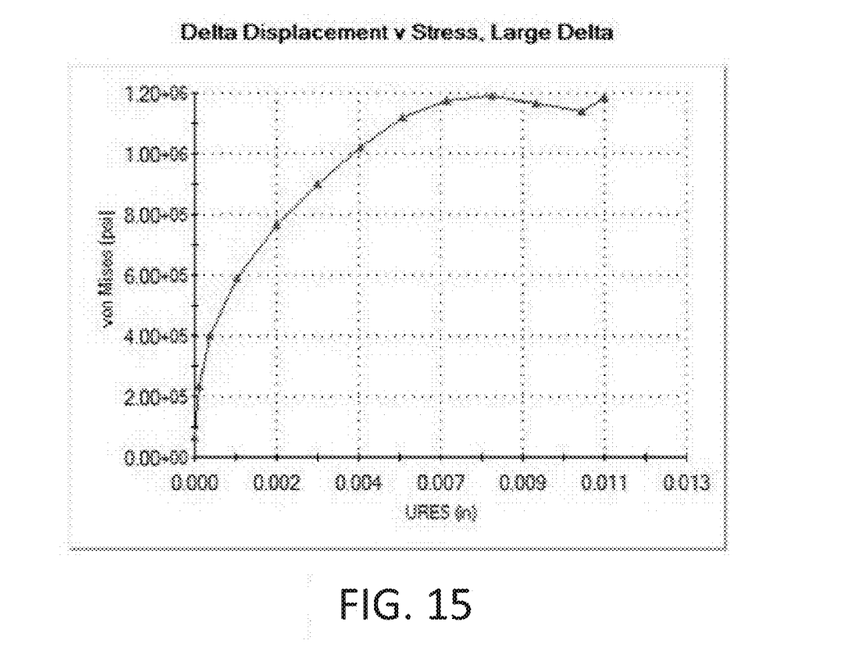
FIG. 15 is a graph illustrating modelling results of the amount of force needed to compress a seal made in accord with FIG. 12.

FIGS. 12 and 13 illustrate a cross-section of a prior art seal with a larger than average "delta" or extension 1240 prior to and after compression, respectively. With this example, like the example of FIGS. 9 and 10, the "delta's" tip or apex is approximately in the middle of the extension 1240 such that after compression, the compressed apex is in the middle of the deformed delta and the fluid-seal surface 1270. With the larger size of the extension or "delta," after compression the fluid-seal surface 1270 has a cross-section about the same as the fluid-tight seal surface 770 illustrated in FIG. 8. Unlike the seal of FIG. 8, however, the seal of FIGS. 12 and 13 still has equal amounts of material on either side of the apex to create a complete seal around a potential nick or dent in the "delta" or extension. This approach reduces the likelihood of sealing around the defect as opposed to the version in FIG. 8, which includes a larger continuous sealing surface between the defect and the fluid-tight seal's edge. Additionally, as illustrated in FIGS. 14 and 15, the compression of the seal having a large "delta" requires significantly more force (shown in FIG. 15) as compared to the compression force needed to achieve a similarly sized sealing surface 770 with the described seal 330 (shown in FIG. 14). These graphs illustrate the force (Y-axis) needed to effect the indicated compression distance (X-axis) as calculated using a known Solid Works computer program model.

While this invention has been described with respect to various specific examples, it is to be understood that various modifications may be made without departing from the scope thereof. Therefore, the above description should not be construed as limiting the invention but merely as an exemplification of preferred embodiments thereof and that the invention can be variously practiced within the scope of the following claims.

What is claimed is:

1. A ring seal for sealing opposing flow component sealing surfaces defining a fluid flow path, the ring seal comprising:
    an annular seal body defining an axial hole for fluid passage in an axial direction;
    opposing sealing surfaces on opposing axial ends of the annular seal body;
    an annular extension extending from at least one of the opposing sealing surfaces in an axial direction, the extension having an apex;
    wherein the annular extension comprises a first extension surface and a second extension surface respectively extending in opposite directions from the apex back toward the sealing surface from which the annular extension extends;
    wherein the first extension surface has a first general oblique angle relative to the axial direction and defines a ridge by transitioning to a second general oblique angle relative to the axial direction extending back toward the sealing surface at a steeper general angle than the first extension surface;
    wherein the ridge defines a portion of the ring seal that, during compression from the apex to the ridge, requires a first compression force less than a second compression force required during compression past the ridge.

2. The ring seal of claim 1 wherein the first extension surface and the second extension surface respectively transition to sealing surface portions approximately perpendicular to the axial direction.

3. The ring seal of claim 2 wherein the second extension surface transitions to its respective sealing surface portion closer to a center line for the annular seal body perpendicular to the axial direction than the first extension surface transitions to its respective sealing surface portion.

4. The ring seal of claim 1 wherein the apex is located within the annular extension closer to the axial hole than to an outer radial diameter of the annular seal body defined by an outer surface radially opposite that of an inner surface that defines the axial hole.

5. The ring seal of claim 4 wherein the apex is located within an inner ½ of the annular extension closer to the axial hole than to the outer radial diameter of the annular seal body.

6. The ring seal of claim 5 wherein the apex is located within an inner ⅓ of the annular extension closer to the axial hole than to the outer radial diameter of the annular seal body.

7. The ring seal of claim 4 wherein the second extension surface extends back toward the sealing surface at a steeper general angle than the first extension surface.

8. The ring seal of claim 7 wherein the first extension surface and the second extension surface respectively transition to sealing surface portions approximately perpendicular to the axial direction.

9. The ring seal of claim 8 wherein the second extension surface transitions to its respective sealing surface portion closer to a center line for the annular seal body perpendicular to the axial direction than the first extension surface transitions to its respective sealing surface portion.

10. A method of sealing a fluid flow path that extends between two fluid flow components, each having a flow component sealing surface surrounding the fluid flow path, using an annular seal body having opposing sealing surfaces on opposing axial ends of the annular seal body and an annular extension extending from at least one of the opposing sealing surfaces in an axial direction, the extension having an apex, the method comprising:
    contacting with an annular seal body a flow component sealing surface for a first fluid flow component of the two fluid flow components, wherein the annular seal body defines an axial hole for fluid passage in an axial direction;
    securing the two fluid flow components to each other to align the flow component sealing surfaces of the two fluid flow components along the fluid flow path and to compress opposing sealing surfaces on opposing axial ends of the annular seal body with the flow component sealing surfaces;
    wherein the compressing the opposing sealing surfaces comprises:
        a first compression of the annular extension at a first compression force during compression of a first portion of the annular extension, wherein the first portion of the annular extension is defined by a first extension surface between the apex and a ridge where the first extension surface has a first general oblique angle relative to the axial direction and defines the ridge by transitioning to a second general oblique angle relative to the axial direction extending back toward the sealing surface at a steeper general angle than the first extension surface;
        a second compression of the annular extension at a second compression force higher than the first compression force during compression of a second portion of the annular extension, wherein the second portion of the annular extension is defined by the first extension surface portion having the second general oblique angle relative to the axial direction extending back toward the sealing surface.

11. The method of claim 10 wherein the apex is located closer to the axial hole than an outer radial diameter of the annular seal body defined by an outer surface radially opposite that of an inner surface that defines the axial hole and wherein the compressing the opposing sealing surfaces further comprises deforming the first portion of the annular extension to have the apex located closer to the axial hole than the outer radial diameter of the annular seal body.

12. The method of claim 11 further comprising deforming the first portion of the annular extension to have the apex located at least within an inner ½ of an intersection between the ring seal and the respective opposing sealing surface.

13. The method of claim 12 wherein the deforming the first portion of the annular extension comprises deforming the first portion of the annular extension to have the apex located at least within an inner ⅓ of an intersection between the ring seal and the respective opposing sealing surface.

* * * * *